United States Patent [19]

Lindner

[11] 4,211,208
[45] Jul. 8, 1980

[54] CONTAINER FOR A HEAT STORAGE MEDIUM

[75] Inventor: Friedrich Lindner, Stuttgart, Fed. Rep. of Germany

[73] Assignee: Deutsche Forschungs- und Versuchsanstalt für Luft- und Raumfahrt e.V., Bonn, Fed. Rep. of Germany

[21] Appl. No.: 860,076

[22] Filed: Dec. 13, 1977

[30] Foreign Application Priority Data

Dec. 24, 1976 [DE] Fed. Rep. of Germany ....... 2658720

[51] Int. Cl.² ............... B65D 25/18; B65D 89/02; F28F 9/00
[52] U.S. Cl. ............... 126/400; 165/46; 165/81; 165/104 S; 220/85 B; 220/426
[58] Field of Search ............... 165/46, 81, 82, 83, 165/137, DIG. 4, DIG. 9, DIG. 16, 104 S; 220/85 B, 426, 437, 448, 71, 72, 461, 435; 206/521, 591, 0.6; 244/135 B, 135 C; 62/529, 530; 126/400

[56] References Cited

U.S. PATENT DOCUMENTS

| | | | |
|---|---|---|---|
| 1,892,527 | 12/1932 | Gray | 206/591 |
| 2,394,853 | 2/1946 | Goddard | 220/437 X |
| 2,432,025 | 12/1947 | Lorenz | 220/85 B |
| 2,621,719 | 12/1952 | Eaton et al. | 244/135 B |
| 2,932,546 | 4/1960 | Marsgraf et al. | 206/591 X |
| 3,016,938 | 1/1962 | Akrep | 220/85 B X |
| 3,219,892 | 11/1965 | Wurster | 165/81 X |
| 3,346,101 | 10/1967 | Pestka | 220/426 X |
| 3,448,775 | 6/1969 | Limback et al. | 220/72 X |

FOREIGN PATENT DOCUMENTS

| | | | |
|---|---|---|---|
| 733073 | 9/1930 | France | 165/81 |
| 104019 | 3/1964 | Norway | 220/85 B |

*Primary Examiner*—Allan N. Shoap
*Attorney, Agent, or Firm*—Lawrence E. Laubscher

[57] ABSTRACT

A container is disclosed for storing a heat storage medium which changes between solid and fluid states to store and release heat, characterized in that the container includes flexible walls which are displaced to vary the volume of the container in accordance with changes of the volume of the heat storage medium when in the solid state. The container includes at least one biasing device which normally biases the resilient walls toward an inwardly contracted condition for storing a first volume of the heat storage medium in the fluid state. During initial removal of heat from the medium, the medium changes from its fluid to its solid state, and upon further removal of heat from the solid medium, the density of the solid medium increases, thereby resulting in a decrease in the volume of the solid medium with the container remaining in its initial contracted condition. Upon addition of heat to the solid medium, the density of the solid medium decreases thereby resulting in an increase in volume of the solid medium and an attendant increase in volume of the container to its expanded condition.

11 Claims, 8 Drawing Figures

CONTAINER FOR A HEAT STORAGE MEDIUM

BACKGROUND OF THE INVENTION

The invention relates to a container for a heat storage medium having in the solid state a density which varies in accordance with the heat content and being convertible from the solid to the fluid state and from the fluid to the solid state in order to store and release heat.

Heat storage means of this kind, wherein the physical condition of the heat storage medium changes between the fluid and solid state are also referred to as latent heat storage means. They have the advantage that the change in the heat content takes place at a substantially constant temperature, namely at the temperature at which the physical condition changes.

Latent heat storage means of this kind are used, for example, in heating systems where they assist the heating system during peak requirements and are recharged by the heating system in the event of low heat requirements.

Latent heat storage means containing Glauber's slat as the heat storage medium have been suggested. Glauber's salt changes from the solid to the fluid state at a temperature of 32.4° C. and thereby releases heat in the amount of 357.3 Btu per liter.

When heat is removed from the heat storage medium, the latter cools down to its melting point and finally changes into the solid state. Upon further cooling down the volume of the solid medium can be decreased by, for example, compression or recrystallization. Conversely, heating of the solid medium results in a thermal expansion thereof until it changes to the fluid state upon arrival at the melting temperature.

The problem consists in the fact that a corresponding increase in the volume of the storage medium resulting from heating the latter has to be accommodated by the heat storage medium container. An increase in the volume cannot be equally distributed inside the container owing to the solid state of the medium, which destroys rigid container walls.

For this reason, heat storage containers of this kind have been made of plastic materials which are expandible and can therefore accommodate the increases in volume which occur. Plastic receptacles of this kind do, however, have the disadvantage that the expansions are not completely reversible and so residual expansion remains after each expansion. The numerous increases and decreases in volume which occur periodically inevitably result in a lasting enlargement of the container, which is not tolerable.

SUMMARY OF THE INVENTION

The object of the invention is to provide a container for a heat storage medium which can accommodate the periodic increases and decreases in the volume of the heat storage medium in the solid state without any lasting change.

According to the invention this object is achieved in a container of the kind first described above by the walls of the container being subjected to an inwardly directed resilient bias.

More particularly, provisions are made to ensure that the container can be of differing volumes, and the bias is selected such that the container assumes a small volume when filled with fluid medium.

It is advantageous for the container to have inwardly curved walls which are adapted to curve outwardly. Resilient spring means curving the walls of the container inwardly can then engage said walls.

The container can also be surrounded by a second rigid closed container with a pressure medium in the space between both containers. This pressure medium can be a gas or a liquid. In the latter case the static pressure of the liquid acts on the walls of the inside container.

The inside container itself can have flexible walls which in a special embodiment can be resiliently expandible.

It is also possible to provide the container with at least one expansion fold. This expansion fold can have a restoring force which attempts to reduce the volume of the container. Spring means can also be provided for this purpose.

BRIEF DESCRIPTION OF THE FIGURES

Further objects and advantages of the subject invention will become apparent from a study of the following specification.

In conjunction with the drawings the following description of preferred embodiments serves as a detailed explanation of the invention.

DETAILED DESCRIPTION

Figure 1:
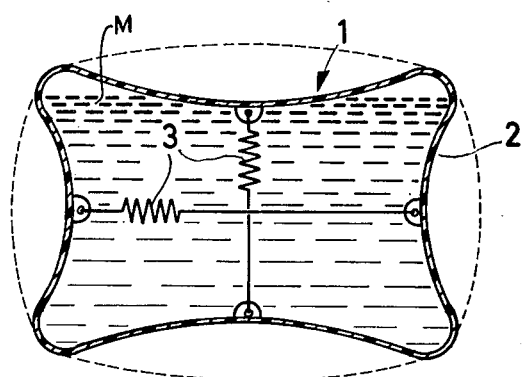
FIG. 1 is a plan view of an inventive container which has been cut open.

The container 1 shown in FIG. 1 for a heat storage medium M, which for reasons of clarity is not illustrated in the following drawings, is of substantial brick-shaped or cube-shaped configuration. All or some of the walls 2 are inwardly curved, i.e., are concave as seen from the outside. Due to the effect of a pressure inside the container 1 these walls 2 can curve outwardly and then assume the position indicated by the dashed lines in FIG. 1. The container then has a substantially larger volume than in the original state.

Tension springs 3 mounted between opposite walls 2 inside the container 1 attempt to draw opposite walls 2 into the inwardly curved position. The tension springs 3 preferably engage the center of the walls.

The spring force of the tension springs 3 is selected such that the walls 2 are in the inwardly curved position when the container is filled with a fluid storage medium. Thus, in this state the container has a small volume. When the storage medium changes into the solid state upon removal of heat a solid body is formed whose outer shape is determined by the inwardly curved walls of the container.

If in the solid phase the heating process results in a decrease in density and thus an increase in volume of the solid storage medium, movement of the walls readily enables expansion of the solid storage medium counteracting the force of the tension springs 3. This expansion can take place to the extent that the container walls are outwardly curved in the manner shown by the dashed lines in FIG. 1. This deformation of the container is completely reversible due to the effect of the tension springs 3, so that upon supplying heat and consequent melting of the storage medium, the container assumes its original shape with inwardly curved walls.

It is therefore essential that the container should due to the effect of tension springs 3 provide the solidifying medium with only a small volume so that an increase in the volume of the container is still possible upon an increase in the volume of the solid medium. Conversely, the solidifying medium in hitherto known containers assumes the entire volume provided by the container at the solidifying stage so that an increase in volume of the solid storage medium unavoidably results in overexpansion or breakage of the container.

Figure 2:
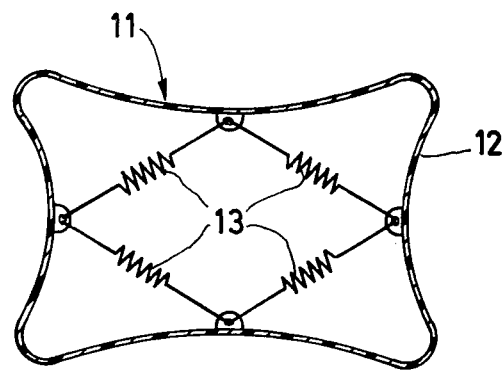
FIG. 2 is a view similar to FIG. 1 of another embodiment of an inventive container.

In FIGS. 2 to 5 further preferred embodiments of containers are illustrated having in the original state walls which are curved inwardly due to the effect of springs. The walls 12 of the container 11 in FIG. 2 are likewise drawn into the inwardly curved position by tension springs 13, however, in contrast to the tension springs 3 in the embodiment shown in FIG. 1, the tension springs 13 are mounted between neighboring walls 2.

Figure 3:
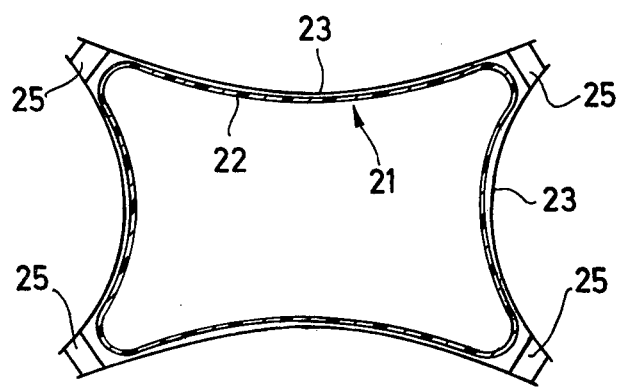
FIG. 3 is a sectional view of an inventive container with leaf springs mounted on the outside.

The container 21 of FIG. 3 is surrounded by four supports 25, between which leaf springs 23 are inserted. These leaf springs exert pressure from the outside on the walls 22 and curve them inwardly. In the event of great inside pressure the walls 32 can be curved outwardly counteracting the spring force of the leaf springs 23.

Figure 4:
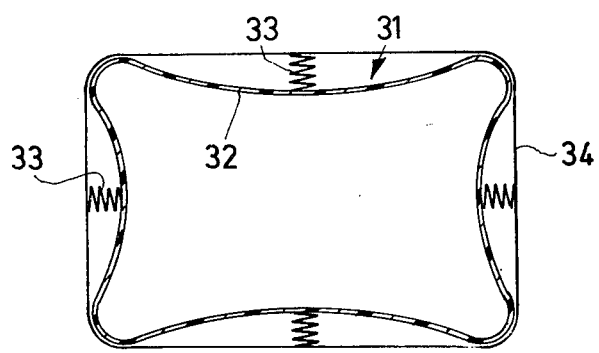
FIG. 4 is a plan view of an inventive container with compression springs acting on the outer walls of the container.

The container 31 shown in FIG. 4 is surrounded by a tension band 34 on which compression springs 33 abutting the opposite side at the walls 32 of the container 31 and curving them inwardly are supported. Instead of the tension band 34 a frame (not illustrated in the drawing) surrounding the container 31 can be used.

Figure 5:
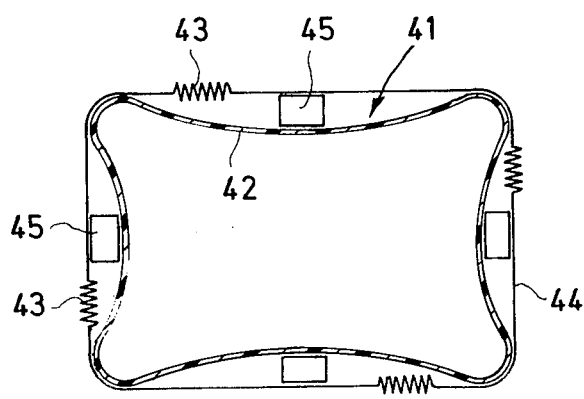
FIG. 5 is a plan view of an inventive container with a resilient tension band.

The embodiment shown in FIG. 5 differs from that shown in FIG. 4 in that tension springs 43 are inserted in the tension band 44 so that the tension band surrounds the container 41 in a resilient manner. Spacer units 45 are mounted between the tension band and the walls 42. Thus, the tension band 44 curves the walls 42 inwardly in a resilient manner due to the effect of the tension springs 43 via the spacer units 45.

Figure 6:
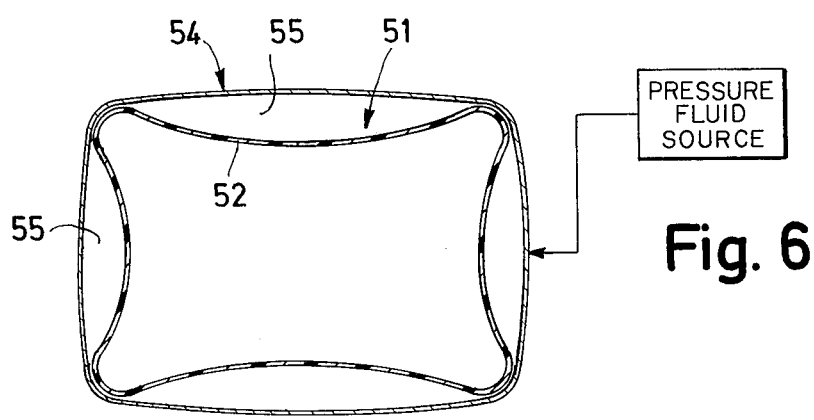
FIG. 6 is a plan view of a container disposed in an outer container in accordance with the invention.

In the embodiment shown in FIG. 6 an inside container 51 accommodating the heat storage medium and comprising inwardly curved walls 52 which are adapted to curve outwardly under the influence of inside pressure, is disposed within a closed outside container 54 having rigid walls. A gas which acts on the walls 52 of the inside container 51 and curves them inwardly in a resilient manner is introduced under pressure into the space 55 between the inside container 51 and the outside container 54. Instead of the gas a liquid can be introduced into the space 55. The static pressure of this liquid acts on the walls 52 of the inside container 51 and attempts to curve them inwardly. Upon an increase in inside pressure as a result of an increase in the volume of the solid storage medium the walls 52 are curved outwardly. Since the liquid is incompressible it must be possible to make way for it. This can be enabled by incomplete filling of the space with a liquid (having a higher specific weight than the fluid storage medium) or by connecting the space to a pressure equalizing vessel. Thus, both the liquid and the gas act on the walls 52 with a resilient inwardly directed force.

The containers described hitherto having inwardly curved walls which are adapted to curve outwardly must have a certain inherent stability. Such containers are preferably made of polyethylene or polypropylene.

Figure 7:
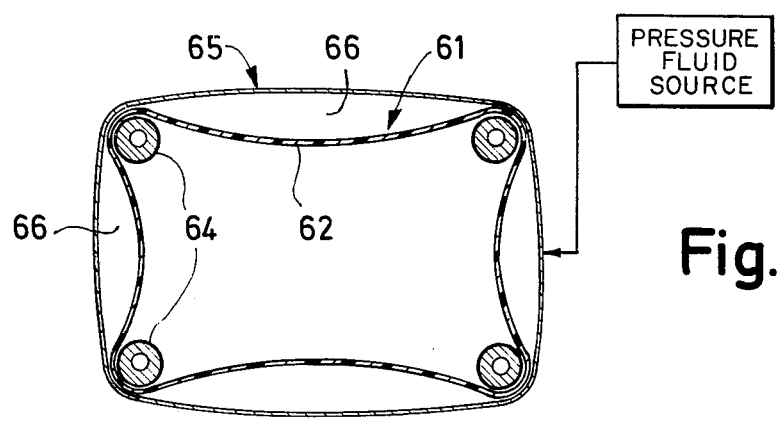
FIG. 7 is a sectional view of another embodiment of an inventive container.

It is also possible to design the container such that it is not inherently stable and has flexible walls. Such an embodiment is illustrated in FIG. 7. An inside container 61 for the heat storage medium having flexible walls 62 is held by a supporting frame 64 which is preferably constituted by the pipes supplying the heat exchange medium. Similar to the embodiment shown in FIG. 6, this inside container 61 is disposed in an outside container 65 having rigid walls. As a compressible pressure medium a gas is located in the space 66. This gas acts from all sides on the container 61 and forces it to assume a small volume. When the inside pressure increases as a result of the thermal expansion of the solid storage medium the walls 62 are curved outwardly counteracting the pressure of the gas in the space 66, so that the increase in volume can readily be accommodated.

Figure 8:
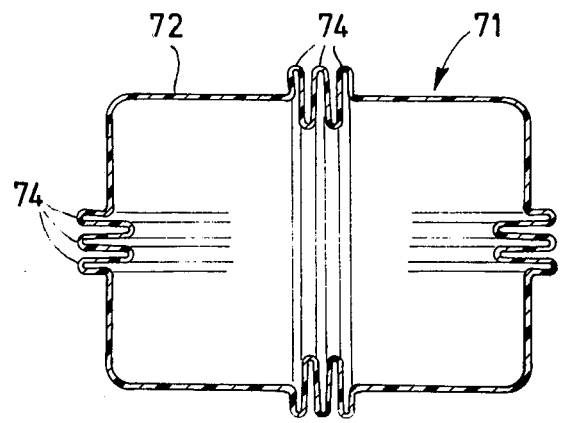
FIG. 8 is a sectional view of a further preferred embodiment of an inventive container.

The container 71 shown in FIG. 8 comprises substantially rigid walls 72, in certain areas of which one or several expansion folds 74 are formed. These expansion folds can have a restoring force of their own, i.e., upon expansion they counteract the expansion in a resilient manner, as is, for example, the case in bellows. It is also possible to tighten the rigid walls together by means of springs so that an expansion of the expansion folds 74 counteracting the effect of these springs takes place. Finally, such a container can also be embedded in the manner shown in FIGS. 6 and 7 in an outside container which has rigid walls and is filled with a pressure medium.

In all of the above-described embodiments of the invention, the volume of the container is kept small when the storage medium is fluid due to the effect of a resilient force acting from the outside on the container accommodating the storage medium. The storage medium thereby solidifies into a small volume and in the event of an increase in volume can reversibly enlarge the volume of the container counteracting the resilient force acting from the outside. The container is thereby subjected to practically no mechanical stress, so that an almost unlimited number of periodic consecutive changes in the volume of the container is possible.

I claim:

1. Apparatus for storing a heat storage medium which changes between solid and fluid states to store and release heat, comprising
   (a) flexible wall means defining an enclosed hollow container, said wall means being relatively displaceable between contracted and expanded conditions in which said container assumes smaller and larger volumes, respectively;
   (b) spring means connected with and biasing said wall means toward the contracted condition; and
   (c) a quantity of a latent heat storage medium filling said container when said wall means is in the contracted condition, said medium having the property of being successively changeable, upon initial removal of heat, from a fluid state to a solid state, and upon subsequent removal of heat, to a condition of greater density, thereby resulting in a decrease in the volume of said solid medium with said wall means remaining in the contracted condition, whereby upon addition of heat to said solid medium, the density of said solid medium decreases, thereby resulting in an increase in the volume of said solid medium and an attendant expansion of said wall means to the expanded condition.

2. Apparatus as defined in claim 1, wherein said latent heat storage medium comprises Glauber salt.

3. Apparatus as defined in claim 1, wherein said spring means comprises a plurality of tension springs connected with the inner surfaces of said walls, respectively.

4. Apparatus for storing a heat storage medium which changes between solid and fluid states to store and release heat, comprising
   (a) flexible wall means defining an enclosed hollow container, said wall means being relatively displaceable between contracted and expanded condition in which said container assumes smaller and larger volumes, respectively;
   (b) a plurality of leaf spring means arranged generally concentrically about said container and in contiguous relation with the outer surfaces of said wall means for biasing said wall means toward the contracted condition; and
   (c) a quantity of a latent heat storage medium filling said container when said wall means is in the contracted condition, said medium having the property of being successively changeable, upon initial removal of heat, from a fluid state to a solid state, and upon subsequent removal of heat, to a condition of greater density, thereby resulting in a decrease in the volume of said solid medium with said wall means remaining in the contracted condition, whereby upon addition of heat to said solid medium, the density of said solid medium decreases, thereby resulting in an increase in the volume of said solid medium and an attendant expansion of said wall means to the expanded condition.

5. Apparatus for storing a heat storage medium which changes between solid and fluid states to store and release heat, comprising
   (a) flexible wall means defining an enclosed hollow container, said wall means being relatively displaceable between contracted and expanded conditions in which said container assumes smaller and larger volumes, respectively;
   (b) spring means biasing said wall means toward the contracted condition, said spring means including
      (1) tension band means extending around the outer peripheral surface of said container; and
      (2) a plurality of tension springs arranged between and connected with said tension band and the outer surfaces of said wall means, respectively; and
   (c) a quantity of a latent heat storage medium filling said container when said wall means is in the contracted condition, said medium having the property of being successively changeable, upon initial removal of heat, from a fluid state to a solid state, and upon subsequent removal of heat, to a condition of greater density, thereby resulting in a decrease in the volume of said solid medium with said wall means remaining in the contracted condition, whereby upon addition of heat to said solid medium, the density of said solid medium decreases, thereby resulting in an increase in the volume of said solid medium and an attendant expansion of said wall means to the expanded condition.

6. Apparatus for storing a heat storage medium which changes between solid and fluid states to store and release heat, comprising
   (a) flexible wall means defining an enclosed hollow container, said wall means being relatively displaceable between contracted and expanded conditions in which said container assumes smaller and larger volumes, respectively;
   (b) spring means biasing said wall means toward the contracted condition, said spring means including
      (1) tension band means including a plurality of tension springs extending around the outer peripheral surface of said container; and
      (2) a plurality of spacer members arranged between the inner surface of said tension band means and the outer surface of said wall means, respectively; and
   (c) a quantity of a latent heat storage medium filling said container when said wall means is in the contracted condition, said medium having the property of being successively changeable, upon initial removal of heat, from a fluid state to a solid state, and upon subsequent removal of heat, to a condition of greater density, thereby resulting in a decrease in the volume of said solid medium with said wall means remaining in the contracted condition, whereby upon addition of heat to said solid medium, the density of said solid medium decreases, thereby resulting in an increase in the volume of said solid medium and an attendant expansion of said wall means to the expanded condition.

7. Apparatus for storing a heat storage medium which changes between solid and fluid states to store and release heat, comprising
   (a) flexible wall means defining an enclosed hollow container, said wall means being relatively displaceable between contracted and expanded conditions in which said container assumes smaller and larger volumes, respectively;
   (b) means connected with and biasing said wall means toward the contracted condition; and
   (c) a quantity of a latent heat storage medium filling said container when said wall means is in the contracted condition, said medium having the property of being successively changeable, upon initial removal of heat, from a fluid state to a solid state, and upon subsequent removal of heat, to a condition of greater density, thereby resulting in a decrease in the volume of said solid medium with said wall means remaining in the contracted condition, whereby upon addition of heat to said solid medium, the density of said solid medium decreases, thereby resulting in an increase in the volume of said solid medium and an attendant expansion of said wall means to the expanded condition.

8. Apparatus as defined in claim 7, wherein said flexible wall means are resilient and bias said container walls toward said inwardly compressed condition.

9. Apparatus for storing a heat storage medium which changes between solid and fluid states to store and release heat, comprising
   (a) flexible wall means defining an enclosed hollow container, said wall means being relatively displaceable between contracted and expanded conditions in which said container assumes smaller and larger volumes, respectively;
   (b) means for biasing said wall means toward the contracted condition, said biasing means including (1) a rigid outer closure member completely enclosing said container; and
(2) means for introducing pressure fluid in the space between said container and the inner surface of said member; and (c) a quantity of a latent heat storage medium filling said container when said wall means is in the contracted condition, said medium having the property of being successively changeable, upon initial removal of heat, from a fluid state to a solid state, and upon subsequent removal of heat, to a condition of greater density, thereby resulting in a decrease in the volume of said solid medium with said wall means remaining in the contracted condition, whereby upon addition of heat to said solid medium, the density of said solid medium decreases, thereby resulting in an increase in the volume of said solid medium and an attendant expansion of said wall means to the expanded condition.

10. Apparatus as defined in claim 9, wherein said pressure fluid introducing means comprises a source of gas under pressure.

11. Apparatus as defined in claim 9, wherein said pressure fluid introducing means comprises a source of liquid under pressure.

* * * * *